Feb. 20, 1923.
H. M. CHASE
1,446,438
TRANSMISSION DEVICE
Filed Nov. 19, 1919     2 sheets-sheet 1
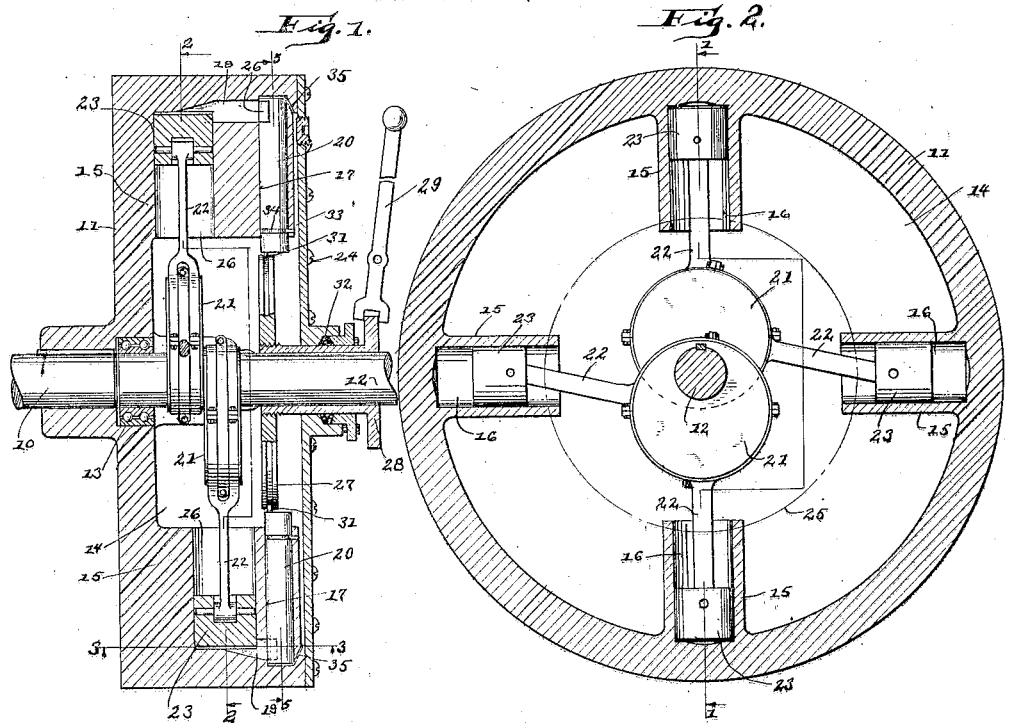
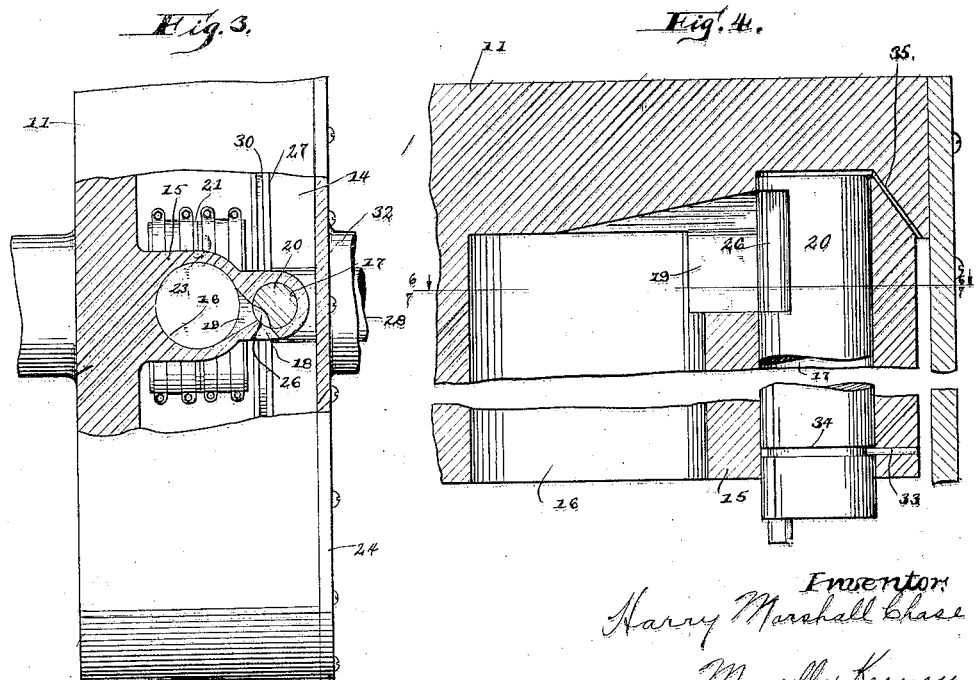
Inventor:
Harry Marshall Chase
By Morsell & Keeney
Attorneys.

Feb. 20, 1923.
H. M. CHASE
1,446,438
TRANSMISSION DEVICE
Filed Nov. 19, 1919
2 sheets-sheet 2
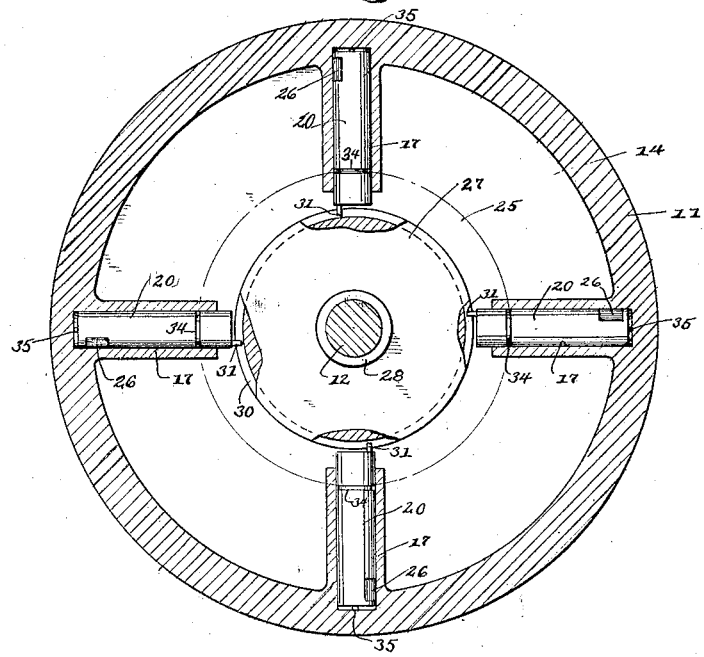
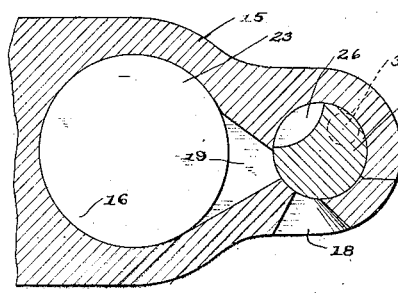
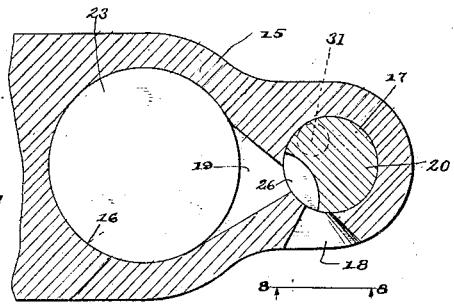
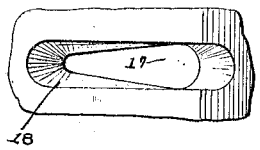
Inventor:
Harry Marshall Chase.
By Morsell & Keeney,
Attorneys.

Patented Feb. 20, 1923.

1,446,438

UNITED STATES PATENT OFFICE.

HARRY MARSHALL CHASE, OF GREEN BAY, WISCONSIN; MARSHALL H. CHASE ADMINISTRATOR OF SAID HARRY MARSHALL CHASE, DECEASED.

TRANSMISSION DEVICE.

Application filed November 19, 1919. Serial No. 339,018.

*To all whom it may concern:*

Be it known that I, HARRY MARSHALL CHASE, a citizen of the United States, and resident of Green Bay, in the county of Brown and State of Wisconsin, have invented new and useful Improvements in Transmission Devices, of which the following is a description, reference being had to the accompanying drawings, which are a part of this specification.

The present invention relates to certain new and useful Improvements in transmission devices, and refers more particularly to a transmission device especially adapted for use with automobiles or other similar vehicles.

One object of the present invention is to provide a transmission device for drivingly connecting a driven shaft and a drive shaft whereby the speed ratio between said shafts may be readily varied.

Another object of my invention is to provide a transmission device which is fluid controlled and which is capable of drivingly connecting a driven shaft and a driving shaft at any speed ratio between a dead stop and a direct drive with respect to said shafts.

A further object of the present invention is to provide a transmission device of the class described which will be contained within the engine fly wheel and thereby greatly reduce the weight and space now taken up by the transmission device in every day use.

A still further object of the present invention is to provide a transmission device of the class described which will be contained within the fly wheel and which is so constructed as to properly balance the fly wheel.

With the above and other objects in view which will appear as the description proceeds, my invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawing, I have illustrated one complete example of my invention constructed according to the best mode I have so far devised for the practical application of the principles thereof, and in which:

Fig. 1 is a view, part in section and part in elevation, taken through my improved combined fly wheel and transmission taken on the plane indicated by the line 1—1 of Fig. 2.

Fig. 2 is a sectional view taken therethrough on the line 2—2 of Fig. 1.

Fig. 3 is a view, part in section and part in elevation, said view being taken on the line 3—3 of Fig. 1.

Fig. 4 is an enlarged sectional view taken through one of the transmission cylinders I employ with its controlling valve, parts being broken away and in section.

Fig. 5 is a sectional view taken on the plane indicated by the line 5—5 of Fig. 1.

Fig. 6 is a sectional view taken on the line 6—6 of Fig. 4.

Fig. 7 is a sectional view similar to Fig. 6 with the valve port partly opened, said view being taken on the line 7—7 of Fig. 4, and Fig. 8 is a fragmentary plan view of the port leading into the valve cylinder, said view being taken on the plane indicated by the line 8—8 of Fig. 7.

Referring now more particularly to the accompanying drawings, the numeral 10 designates an engine crank shaft or driving shaft having a fly wheel 11 secured to the end thereof; and 12 a driven shaft having its forward end freely journalled in the fly wheel 11 as at 13 and having its rear end connected with the drive wheels of the vehicle upon which the transmission is employed.

The fly wheel 11 is recessed to provide an interior chamber 14 and has a plurality of cylinders 15 formed therein with the axes of their bores 16 radiating from the center of the fly wheel. Adjacent each cylinder bore 16 is a valve receiving bore 17 having a port or opening 18 in its upper end adapted to be connected with the port 19 leading from the cylinder to the bore 17 by means of a rotary valve 20 to be later described. Two eccentrics 21 are fixed to the portion of the shaft 12 disposed within the chamber 14 of the fly wheel and have their throws oppositely offset and connected by means of eccentric straps 22 with pistons 23 workable within the cylinders 16. In order to preserve the balance of the fly wheel 11, opposite cylinders 16 have their pistons connected with different eccentrics 21 as best shown in Fig. 2, whereby the opposite pistons will at all times be equally distant from the fly wheel center. This arrangement is provided by slightly offsetting the opposite cylinders, as best shown in Fig. 1 and the eccentric straps 22 engaging the same eccentric have what is commonly termed in the art a forked interlocking connection with the eccentric.

The chamber 14 of the fly wheel is enclosed by means of a plate 24 and is partly filled with a suitable fluid, preferably oil, which fluid is thrown, by centrifugal force, from the center of the fly wheel and will be disposed outwardly of the dotted line 25, see Figs. 2 and 5, when the fly wheel is rotated. With the fly wheel being rotated and the ports 18 and 19 in communication as depicted in Fig. 3, with the indentation or recess 26 of the valves 20 in register therewith, the fluid or oil within the chamber 14 will be free to pass in and out of the cylinder 16 and consequently the pistons 23 will work within the cylinders and the driven shaft 12 remain stationary. When the valves 20 are operated to partly close the port 18 as depicted in Fig. 7, the passage of fluid to and from the cylinders 16 is slightly obstructed and therefore the shaft 12 will be rotated if the slippage of fluid through the ports 18 and 19 is insufficient to permit the free working of the pistons within the cylinders.

As the opening of the port 18 is further decreased the traction or driving connection between the shafts 10 and 12 will also be increased and when the ports 18 and 19 are closed off from each other a straight drive will be had between the shafts 10 and 12 as will be obvious, this preventing the working of the pistons 23 within the cylinders. In order to insure the efficient operation of the valves 20 they must be worked in unison and to accomplish this I provide a disc member 27 which is carried by a sleeve member 28 having one end outwardly of the fly wheel cover 24 and connected with a control lever 29. The disc 27 has a groove 30 formed in its outer periphery and in the groove 30 is mounted a pin or stud 31 formed on the lower end of each valve 20 and so arranged that when the disc 27 is moved outwardly by an inward pull on the lever 29 the valves will be operated to close the ports 18 and 19 and thus connect the shafts 10 and 12 as before described.

The recess 26 of each valve 20 is so positioned with respect to the stud 31 that the stud 31 will never need be moved to a dead center and thus prevent its return to the opposite position. By this structure it will readily be seen that the valves 20 are rotated in unison and that the shaft 12 is journalled within the sleeve member 28, and that the sleeve member 28 is also free to rotate within the packing gland 32 formed in the cover and thus friction between the parts is reduced to a minimum.

The valves 20 are rotatably secured in the bore 17 against dislodgment by means of a pin 33 secured in the wall enclosing each bore 17 and projecting into an annular groove or channel 34 formed in each valve 20. To prevent any fluid which may be forced between the outer end of each valve 20 and the adjacent valve bore 17 from binding the valve against the pin 33 I provide a small by-pass opening 35 connecting the small space between the outer end of the valve and the valve bore with the chamber 14.

As best shown in Fig. 8, the port 18 is tapered in order that the opening of the port will be gradually closed or opened and thus permit the smoother operation of the transmission and eliminate the jerky or rough starting so noticeable in the old form of transmission.

From the foregoing description taken in connection with the accompanying drawing, it will be readily seen that I provide a transmission device which will efficiently couple the driven shaft and the drive shaft together at varying speed ratios and that the change from one ratio to another is very gradual in contra-distinction with the selective gear transmissions now in general use. It will also be seen that by maintaining the pistons in opposite cylinders at the same distance from the center at all times and in all positions the perfect balance of the fly wheel is preserved and thus undue vibration is eliminated.

What I claim for my invention is:

1. A transmission device comprising a driving and a driven shaft, a fly wheel fixed to the driving shaft and provided with a recess, a fluid partly filling said recess, and held in operative position by centrifugal force, a plurality of cylinders disposed in said recess and carried by the fly wheel, the axes of said cylinders radiating from the center of said fly wheel, pistons workable within the cylinders, means connecting said pistons with the driven shaft having one end disposed within the recess of said fly wheel, the pistons of opposite cylinders being at all times equally distant from the center of the fly wheel, and rotatable valve means for controlling the passage of a fluid to and from the cylinders whereby the speed ratio between the driven shaft and the drive shaft is controlled.

2. A transmission device comprising a driven shaft, a driving shaft, a fly wheel fixed to the driving shaft, said fly wheel having its interior hollowed out to provide a chamber, a plurality of cylinders radially mounted within said fly wheel chamber, a piston workable within each cylinder, eccentrics fixed to the portion of the driven shaft disposed within said fly wheel, said driven shaft being normally free of said fly wheel, eccentric straps connecting the pistons with said eccentrics, valve ports for connecting the cylinders with said fly wheel chamber, cylindrical valve means for closing and variably opening said valve ports, and a pin on the end of each valve co-operating with a disk on a collar slidable on the driven shaft for operating said valves in unison, whereby the flow of fluid to and from said cylinders is controlled to govern the speed ratio between the driven shaft and the drive shaft.

3. A transmission device comprising a driving and a driven shaft, a fly wheel fixed to the driving shaft, said fly wheel having its interior hollowed out to provide a chamber, a fluid partly filling said chamber and held in operative position by centrifugal force, a plurality of cylinders radially mounted within said fly wheel chamber, a piston workable within each cylinder, eccentrics fixed to the portion of the driven shaft disposed within said fly wheel, said driven shaft being normally free of said fly wheel, eccentric straps connecting the pistons with said eccentrics, valve ports for connecting the cylinders with said fly wheel chamber, valve means for closing and variably opening said valve ports, and means for operating said valve means in unison, whereby the flow to and from said cylinders is controlled to govern the speed ratio between the driven shaft and the drive shaft, said means including a slidably mounted disc connected with the valve means and a control lever for moving said disc to operate said valve means.

In testimony whereof, I affix my signature.

HARRY MARSHALL CHASE.